United States Patent Office 2,965,495
Patented Dec. 20, 1960

2,965,495

ELECTROSTATIC PRECIPITATION OF ANTIMYCOTICS

Herbert G. Foster, Jr., Hazel Crest, and Robert H. Mroch, Oak Park, Ill., assignors to Swift & Company, Chicago, Ill., a corporation of Illinois No Drawing. Filed May 7, 1958, Ser. No. 733,494

7 Claims. (Cl. 99—162)

The present invention relates in general to an improved method for producing a substantially mold-free cheese or the like.

The susceptibility of cheese, both natural and process, to mold growth has long been recognized as a problem to the manufacturer, dealer and consumer of cheese. Many methods have been utilized in an effort to solve the problem, but these have been successful only to a limited degree and have not been effective with all cheese products. A particularly difficult problem has been the keeping of consumer pieces of natural cheese free from mold growth during the time that they remain in the dealers' stores and subsequently while they are in the consumers' refrigerators. A gas-impervious, completely sealed package will prevent mold growth of natural cheese if that cheese will utilize oxygen and produce carbon dioxide. However, Swiss cheese, for example, because of the characteristic eyes thereof, contains enough oxygen to support mold growth; medium sharp and sharp cheeses do not generate carbon dioxide. Consequently, a tight, gas-impervious, package of these cheeses will not insure a satisfactory keeping quality of the cheese. Subjecting packages of cheese wedges wrapped in polyvinylidene chloride to sufficient heat to bring the butteroil to the surface (a process known as "oiling") is not satisfactory with pieces of natural cheese; nor is vacuum packaging in conjunction with the addition of flooding gases such as nitrogen or carbon dioxide, unless a very high percentage of the packages are leak-proof.

It is therefore an object of the present invention to produce a cheese which is resistant to mold growth.

A further object of the invention is to provide a method whereby an antimycotic agent is deposited on cheese in sufficient amount to render the cheese substantially mold-proof.

A still further object is the efficient covering of the entire surface of a cheese slice, or the like, with a mold inhibiting amount of an antimycotic.

Further objects and advantages will become apparent from the following description of the invention.

We have discovered that it is possible to spray an antimycotic agent, such as crystalline sorbic acid, through an electrostatic field and deposit that agent on the surface of cheese. In this regard we have found that although sorbic acid is more soluble in oil than in water, if the cheese is heated sufficiently to bring the oil to the surface the subsequent electrostatic precipitation of the sorbic acid is ineffective to produce a mold-free product. Therefore, in treating the cheese it is important to maintain water as the continuous phase on the surface of the cheese, i.e. to treat cheese having substantially no free fat on the surface thereof—an "unoiled" cheese.

What particular phenomena occur between the surface of the cheese and the sorbic acid in order to bind them is not completely understood inasmuch as the surface of the cheese is a complicated system and not predictable in its characteristics as would be a material with a regular structure. In any event, it is possible to deposit a mold-inhibiting amount of the antimycotic agent through electrostatic deposition provided there is no substantial oil surface on the cheese. Contrasted to this, it has been found that by dusting or shaking sorbic acid onto the cheese by the "paper bag method" (familiar to any housewife as a convenient way to flour pieces of chicken), or by placing the cheese in a water solution of a metallic salt of sorbic acid, or by merely spraying un-ionized particles of sorbic acid on the cheese, it is not possible to bind the sorbic acid to the cheese surface uniformly and in quantities sufficient to effectively inhibit mold growth.

In the preferred practice of the method of our invention we spray the crystalline sorbic acid by means of a spray gun operated at about 30# air pressure. A spray gun of the type used for applying flock finishes is suitable for our purposes. However, it is to be understood that the type of spraying equipment employed is not critical. Any apparatus that will produce a good dispersion of the sorbic acid particles, e.g. an apparatus that will produce a sheet-like continuous spray of those particles in a given plane, will be eminently suitable. An electrostatic field is then created, as for example by highly charging a ring having a series of points inwardly projecting at an angle from its periphery. Again it should be noted that this is merely our preferred means for setting up an electrostatic field. Other means may be used, as for example a pair of spaced electrodes adapted to be energized by suitable generating equipment. Preferably the spraying apparatus is isolated from the electrical apparatus and does not impart any charge to the spray particles nor tend to attract any stray particles of the mold inhibiting material to be deposited. The cheese is placed in front of the ring and is kept at ground potential. The apparatus to be used for dispersing the sorbic acid crystals is set in operation and the spray of crystalline sorbic acid particles is projected through the electrostatic field. The particles thereby become ionized and ultimately are uniformly precipitated, or deposited, on the cheese. The entire apparatus is preferably placed in a suitable enclosure, as for example a metal cabinet or an insulated cabinet.

The exact positioning of the elements used in this method is not critical. So long as the source of crystalline sorbic acid and the spraying equipment is maintained at one end of the electrostatic field and the material to be coated with the sorbic acid is maintained at the other end of the electrostatic field, the distances between the spraying equipment and the highly charged field and between the charging field and the material to be coated is dictated by practical considerations such as the speed of the particles ejected by the spraying apparatus, the amount of acid flow, the amount of coating material necessary to be deposited and the voltage at which it is desired to operate. It is apparent that the operation could be made continuous by placing the cheese on a suitable moving conveyor, such as a belt conveyor, which conveyor is kept at ground potential, and depositing the sorbic acid on the cheese while it is being moved through the plane of the sorbic acid dispersion.

The length of time necessary to continue the spraying in order to precipitate the amount of sorbic acid inhibitor required to produce a substantially mold-proof cheese may be adjusted through the length of time that the spraying apparatus is operative or, in the case of the continuous operations, by the speed of the belt conveyor and/or length of time of the spray. Suitable adjustments in the air flow through the spraying apparatus and the amount of acid flow may be used in conjunction with the above in order to arrive at a time of exposure suitable for depositing sufficient sorbic acid on the cheese to effectively inhibit mold growth.

With regard to the resistance to mold growth, cheese, 99% of which will remain free of mold when stored for 90 days at 45° F. (which is roughly the same as storage for one month at 60° F.) is considered to be substantially mold-proof. We have determined that to insure keeping qualities of this type at least about 0.02% by weight of the cheese (200 p.p.m.) of sorbic acid is necessary, with perhaps about 0.1% by weight (1000 p.p.m.) being optimum. We have deposited amounts of sorbic acid up to about 3000 p.p.m. by our process with good results. Considerations such as cost of the materials, government standards, and appearance of the cheese are factors which dictate the amount of sorbic acid which is to be used.

It is seen from the foregoing that there are a number of variables present, i.e. the time of the spray, the speed of the conveyor, if used, the air pressure utilized, the amount of acid flow, the distance between the charged ring and the product, and the voltage on the ring, or other preionizer. While there are optimum ranges of these variants, the figures are not critical and may be varied with varying degrees of efficiency in the method. We have found the following values to be particularly suitable in practicing our preferred method: A conveyor speed of about 15 to 20 feet per second and an air flow of between about 4000–6000 feet per minute. The amount of sorbic acid consumed is about 8–10 grams per minute. The distance between the spray nozzle and the charged ring is preferably from about 4 to 8 inches, and the distance between the charged ring and the product to be coated is preferably from about 12 to 18 inches. Between about 25,000–30,000 volts D.C. is a suitable voltage.

The following is a specific example of the practice of our method. It is included only for purposes of illustration and is not to be considered in any way limiting the scope of the invention.

Slices of cheddar cheese (both mild and aged) and Swiss cheese were placed on a belt conveyor moving at 18.9 feet per second, maintained at electrical ground, and positioned 15 inches from a charged ring maintained at a voltage of 25,000 volts. A spray gun, positioned 6 inches from the charged ring (and thus approximately 21 inches from the product on the conveyor) was operated at an air flow of 6000 feet per minute (on the basis of air flow into free space). Sorbic acid crystals were sprayed in an amount of 9.72 grams per minute and directed toward the charged ring. It was found that under these conditions, as the cheese moved through the area in which the charged particles of sorbic acid were being dispersed, 960 p.p.m. of sorbic acid (0.096% by weight) were uniformly deposited on the cheese slices. The cheese was stored at 45° F. for 90 days and tested at that time for mold growth. Each of the slices was found to be free from mold growth.

It will be apparent that both surfaces of the cheese may be coated, if desired, in order to insure that the product will be substantially mold-proof, such as by running the cheese through the enclosure containing the electrostatic depositing mechanism twice, turning the cheese over for the second run.

By use of the term "cheese" we intend to include natural as well as process cheese, and any consumer cuts made therefrom, e.g. cut pieces and slices.

From the foregoing it will be apparent to one skilled in the food processing art that our invention would be applicable to use with other foods, such as table ready meats, where keeping quality of consumer packages is a problem.

Obviously many modifications and variations of the invention as hereinbefore set forth may be made without departing from the spirit and scope thereof and therefore only such limitations should be imposed as are indicated in the appended claims. For example, in an alternative method the particles of antimycotic agent pass through the charged ring, or preionizer, maintained at a voltage differential of about 10,000 volts, becoming negatively charged as they do so. By force of the spray they continue past the preionizer and travel between two charged plates which are in substantially parallel alignment. One plate is made of metal, the other consists of the material to be coated. The metal plate is maintained at about a negative 60,000 volts and the cheese or other material is kept at electrical ground. The particles passing through this high intensity field migrate toward electrical ground and are thereby deposited on the product to be coated.

We claim:

1. The method of producing substantially mold-proof cheese, which comprises creating an electrostatic field, maintaining a source of crystalline sorbic acid particles at one end of said field, placing unoiled cheese at the opposite end of said field, said cheese being maintained at ground potential, and projecting a spray of said crystalline sorbic acid particles from said one end of said field through said field, whereby said particles become ionized and subsequently are deposited on the surface of said cheese.

2. The method of producing substantially mold-proof cheese which comprises placing unoiled cheese at a given point, maintaining said cheese at ground potential, and directing a dispersion of crystalline sorbic acid particles carrying an electrostatic charge toward said point, whereby said particles are uniformly deposited on the surface of said cheese.

3. The method of producing substantially mold-proof cheese which comprises placing unoiled cheese at a given point, maintaining said cheese at ground potential, and directing a dispersion of crystalline sorbic acid particles carrying an electrostatic charge toward said point, whereby said particles are uniformly deposited on the surface of said cheese in an amount of at least about 0.02% by weight of the cheese.

4. The method of producing substantially mold-proof cheese which comprises projecting a dispersion of crystalline sorbic acid particles carrying an electrostatic charge in a given direction to form a continuous spray in a given plane, depositing cheese on a conveyor adapted to intersect said plane, said conveyor being maintained at ground potential, and energizing said conveyor whereby as said conveyor intersects said plane the crystalline sorbic acid particles are uniformly deposited on the surface of said cheese.

5. The method of producing substantially mold-proof cheese which comprises: placing unoiled cheese at a first point, maintaining said cheese at ground potential, placing an oppositely charged plate at a second point substantially in parallel relationship with said cheese, projecting a spray of crystalline sorbic acid particles carrying an electrostatic charge between said first point and said second point, whereby said charged particles are attracted to said cheese and are uniformly deposited on the surface of said cheese.

6. In the production of cheese having incorporated therein an antimycotic agent, the improvement comprising setting up an electrostatic field, directing a spray of crystalline sorbic acid particles through said field whereby said particles become ionized, and uniformly depositing on an unoiled cheese at least about 0.02% of said ionized particles by weight of said cheese, whereby said cheese is rendered substantially mold-proof.

7. An unwrapped substantially mold-proof unoiled cheese, the surface of which comprises a homogenous aqueous dispersion of sorbic acid particles, said sorbic acid particles being present in the amount of at least about 0.02% by weight of said cheese.

References Cited in the file of this patent

UNITED STATES PATENTS

| | | |
|---|---|---|
| 2,379,294 | Gooding | June 26, 1945 |
| 2,758,535 | Roberts | Aug. 14, 1956 |
| 2,789,914 | Davis | Apr. 23, 1957 |
| 2,844,478 | Hanley | July 22, 1958 |

OTHER REFERENCES

Food Technology, March 1954, article by D. P. Smithe and N. J. Rollin, "Sorbic Acid as a Fungistatic Agent for Foods," pp. 133 to 135.

Food Engineering, October 1954, article by H. H. Mottern, "Cheese Keeps Longer," pp. 93 and 94.